United States Patent
Broomall et al.

(10) Patent No.: US 10,706,087 B1
(45) Date of Patent: Jul. 7, 2020

(54) DELEGATED DECISION TREE EVALUATION

(71) Applicant: Amazon Technologies, Inc., Seattle, WA (US)

(72) Inventors: Jamie Broomall, Seattle, WA (US); Naveen Balakrishnan, Seattle, WA (US); Carlos Alvarez Barragan, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 135 days.

(21) Appl. No.: 16/013,512

(22) Filed: Jun. 20, 2018

(51) Int. Cl.
*G10L 15/30* (2013.01)
*G06F 16/332* (2019.01)
*G06K 9/62* (2006.01)
*G06F 9/54* (2006.01)
*G10L 15/26* (2006.01)
*H04L 12/58* (2006.01)
*G10L 15/22* (2006.01)

(52) U.S. Cl.
CPC .......... *G06F 16/3329* (2019.01); *G06F 9/542* (2013.01); *G06K 9/6282* (2013.01); *G10L 15/22* (2013.01); *G10L 15/26* (2013.01); *H04L 51/02* (2013.01); *G10L 2015/225* (2013.01)

(58) Field of Classification Search
CPC combination set(s) only.
See application file for complete search history.

(56) References Cited

U.S. PATENT DOCUMENTS

2017/0358296 A1* 12/2017 Segalis ................ G06Q 10/10
2019/0286906 A1*  9/2019 Bivens ................. G06N 5/02

* cited by examiner

*Primary Examiner* — Abul K Azad
(74) *Attorney, Agent, or Firm* — Thomas Horstemeyer, LLP

(57) ABSTRACT

Disclosed are various embodiments for delegated evaluation of a decision tree. A client device receives an expression and a plurality of responses from a second computing device, the expression providing an evaluation of a user input and each of the plurality of responses representing a potential response for the first computing device to provide to the user input. The client device then evaluates the user input with the expression received from the second computing device to determine a user intent. The client device then selects a response to the user intent from the plurality of responses and renders the response within a user interface.

20 Claims, 7 Drawing Sheets

US 10,706,087 B1

DELEGATED DECISION TREE EVALUATION

BACKGROUND

Automated service agents often use decision trees to determine the next action to perform in a sequence or series of interactions. For example, an automated service agent may receive user input from a client device, and use a decision tree to provide a response to the client device based at least in part on the user input. However, when the automated service agent is executed on a computing device separate from the client device, network conditions (e.g., latency, bandwidth, connectivity, etc.) may impact the perceived performance of the automated service agent.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments that involve delegated decision tree evaluation. A client device may receive portions of a decision tree from another, remote computing device in data communication with the client device and cache these portions. An individual node in the decision tree may provide the client device with the data necessary to evaluate user input, determine the next node or branch in the decision tree to proceed to, and to provide a response to the user input or take an action in response to the user input. Nodes from branches of the decision tree that are not pursued can be removed from the memory of the client device. The client device can also request from the remote computing device additional nodes that descend from the branch of the decision tree that is currently being followed, and replace the deleted nodes with additional nodes of the decision tree that descend from the branch of the decision tree that is currently being followed. The client device can then evaluate user input and respond accordingly using the cached nodes of the decision tree, while continuing to prune and replace cached nodes in the background.

Accordingly, the impact of network conditions can be hidden from the user. For example, a client device can evaluate the user input locally and decide an appropriate response based on a locally stored node of the decision tree. This allows for a response to a user interaction with the client device to be perceived by the user as happening immediately. In contrast, if the client device were required to send the user input to the remote computing device for evaluation and wait for a response, adverse network conditions such as high latency, low bandwidth, or even a temporary disconnection (e.g., a mobile device disconnecting from a cellular network when entering a tunnel or a portion of a building) could delay the client device from providing a response in an acceptable time frame for the user. In the following discussion, a general description of the system and its components is provided, followed by a discussion of the operation of the same.

Figure 1:
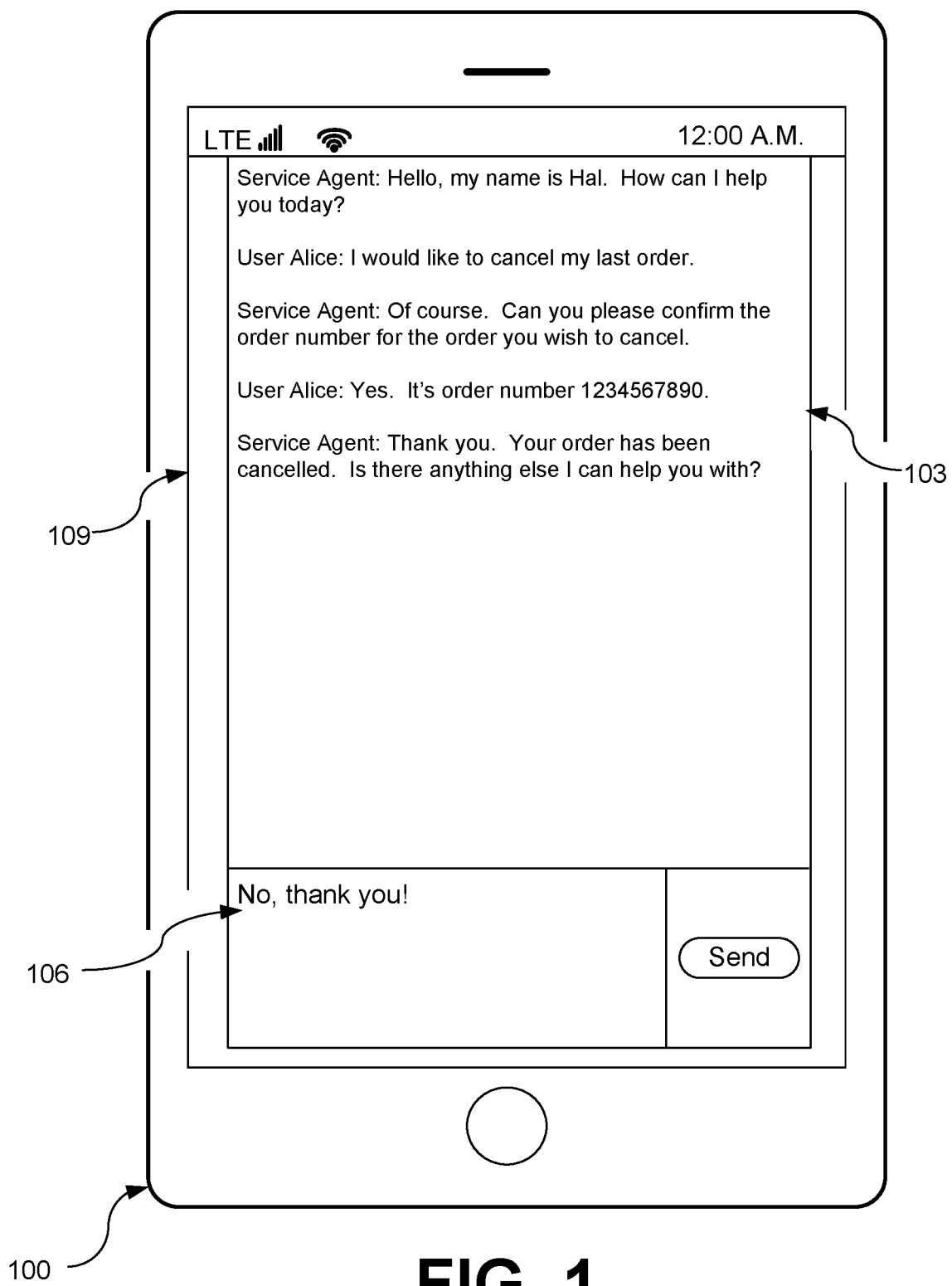
FIG. 1 is a drawing depicting an example of the operation of one of several embodiments of the present disclosure.

FIG. 1 illustrates an example client device 100 according to various embodiments of the present disclosure. As illustrated, a client device 100 displaying a conversation 103 between a user and an automated service agent is depicted. A user is able to enter free-form text within a user interface 106 rendered on a display 109 of the client device 100. As further described in this application, each statement entered by the user may be evaluated by the client device 100 using expression logic included in a node of a decision tree that is cached on the client device 100. Responses to the user can then be provided within the user interface 106, based on the current node in the decision tree and the result of the evaluation, without being affected by network conditions (e.g., bandwidth, latency, connectivity, etc.).

Figure 2A:
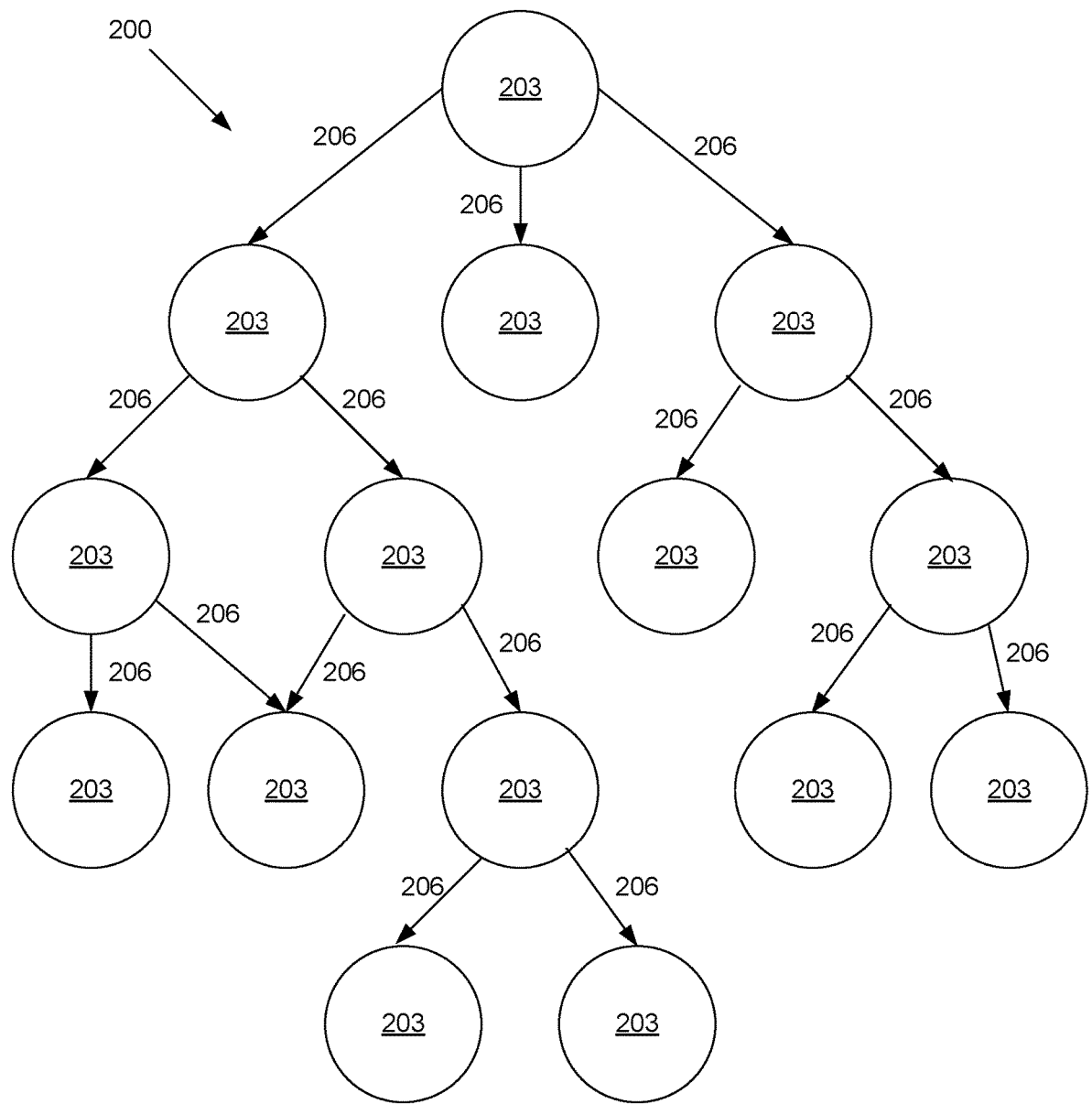
FIG. 2A and FIG. 2B depict a decision tree data structure according to various embodiments of the present disclosure.

FIG. 2A depicts an example of a decision tree 200 according to various embodiments of the present disclosure. The decision tree 200 uses a graph or similar data structure to model decisions and the outcomes of the decision. Accordingly, a decision tree 200 can include a number of nodes 203, each node 203 representing a decision to be made in response to a user input or an action to be made in response to a user input. Each edge 206 between nodes 203 of the decision tree 200 represents a result of a decision that was made or an action that was performed. Moreover, each node 203 can have any number of child nodes 203 or edges 206.

For example, a node 203 may represent a decision whether or not to cancel an order based at least in part upon a user's input. The node 203 could have two child nodes 203, each connected to the node 203 by an edge. The edge between the node 203 and its first child node 203 could represent a decision that an order will not be cancelled. Accordingly, the first child node 203 could represent the subsequent user input to be evaluated or a subsequent action to be performed in response to a determination that an order will not be cancelled. Likewise, the edge between the node 203 and its second child node 203 could represent a decision that an order will be cancelled. Accordingly, the second child node 203 could represent the subsequent user input to be evaluated or subsequent action to be performed in response to a determination that the order will be cancelled.

Figure 2B:
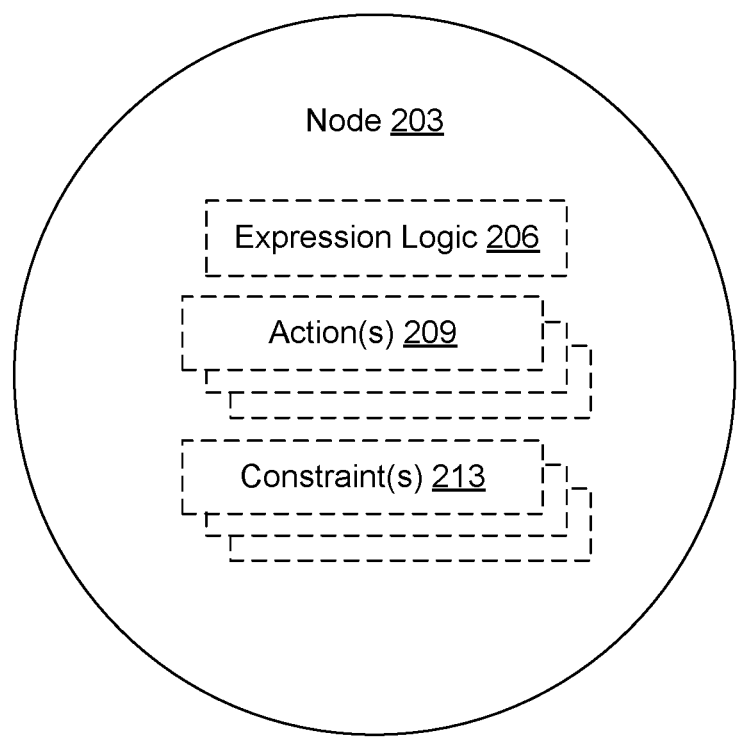

FIG. 2B depicts an example of a node 203 of a decision tree 200 (FIG. 2A) according to various embodiments of the present disclosure. As shown, a node 203 can include expression logic 206, one or more actions 209, one or more constraints 213, and potentially other data. For example, some nodes 203 may include a unique identifier or other data to assist in referencing the current state of the decision tree 200.

The expression logic 206 represents executable application code or similar logic that can be used to evaluate a user input to determine a user's intent. The executable application code or similar logic may include computer instructions that can be executed by another application. For example, the expression logic 206 could include a regular expression or similar construct that defines a search pattern for one or more characters in a string.

As a simple example, the expression logic 206 could include a regular expression that searches for the character string "yes" in order determine a user's assent. More complicated regular expressions could be used to identify alternative indications of user assent. As another example, the expression logic 206 could include executable code that uses sensors attached to or included in the client device 100 (FIG. 1) to evaluate alternative user input. For instance, the expression logic 206 could include executable instructions to identify motion in a video of the user captured by a camera of the client device 100 (e.g. a smartphone camera) and determine whether a user is nodding his or her head to indicate "yes" or "no."

In another implementation, the expression logic 206 could include executable instructions to identify gestures or objects in a photograph captured by a camera of the client device 100 that indicate "yes" or "no," such as an image where user is giving a "thumbs up" or an "OK" gesture. In these instances involving computer vision, the expression logic 206 can also include data structures such as a neural network with appropriate weights that have already been trained to identify the corresponding gestures.

Similarly, the expression logic 206 could include executable instructions to use the camera of the client device 100 to track the facial expressions of a user. For example, the executable instructions could provide a mechanism for tracking eye movements of a user to predict a user's response. For example, if a user were going to press a "yes" button instead of a "no" button, the user might first move their eyes to look at the "yes" button prior to pressing the "yes" button. The expression logic 206 could include executable instructions to identify the direction of the user's gaze to predict the user's response. In response, the client device 100 could predictively move to the next node 203 in the decision tree 200 based on the direction of the user's gaze. In these instances, the expression logic 206 could also include data structures such as a neural network with appropriate weights that have already been trained to identify and track the gaze of a user.

As another example, the expression logic 206 could include executable instructions to process data received from biometric sensors installed on the client device 100. For example, the expression logic 206 could use a heart-rate or pulse sensor to detect changes in a user's heart-rate. An increase in the heart-rate of a user could be interpreted as excitement or interest in a particular option. In response, the client device 100 could predictively move to the next node 203 in the decision tree 200 based on which option appears to excite the user. For example, if a user's gaze were focused on a particular option and his or heart rate slightly increased, it could indicate that the user is excited about the option the user is looking at and is likely to select it. In response, the client device 100 could predictively move to the next node 203 in the decision tree 200.

An action 209 represents an action to be performed based at least in part on the result of an evaluation of the expression logic 206. An action can also include a link to or identifier of a subsequent node 203 in the decision tree 200 (FIG. 2) or even to a new node 203 in a different decision tree 200. For example, if the expression logic 206, when evaluated, indicated that a user's intent was to cancel an order, the action 209 could specify that the order number or identifier should be requested from the user and also indicate that the next node 203 to proceed to in the decision tree 200 is a node 203 for confirming the user's decision.

In some instances, the node 203 can include multiple alternative instances of expression logic 206. Each alternative instance of an expression logic 206 could be linked to or result in a different action 209 being performed. For example, a node 203 could include two alternative regular expressions. The first regular expression might match character strings that indicate assent or consent, such as "Yes," "Yeah," "OK," "Correct," or other character strings. If a portion of a user's text input matches the first regular expression, then one action 209 would be performed and the flow through the decision tree 200 would proceed to a first child node 203. The second regular expression could match character strings that indicate dissent, such as "No," "Nope," "Incorrect," or other character strings. If a portion of a user's text input matches the second regular expression, then another action 209 would be performed and the flow of the decision tree 200 would proceed to a second child node 203.

However, it should also be noted that multiple instances of expression logic 206 can be used together to determine a user's intent. For example, expression logic 206 analyzing a user's gaze could be used in conjunction with expression logic 206 related to natural language processing to provide more accurate results. As previously discussed, expression logic 206 for analyzing a user's gaze could be combined with expression logic 206 analyzing biometric data such as a user's heart rate. Other combinations of expression logic 206 may also be used in combination to increase the accuracy of an assessment of a user's intent compared to the use of a single expression logic 206.

A constraint 213 represents constraints on execution of the evaluation logic 206 or performance of one or more of the actions 209. Such constraints 213 may assist in keeping the current state of the decision tree 200 consistent with the event that is being modelled. For example, a constraint 213 could specify a period of time in which the expression logic 206 must be evaluated by the client device 100 or an action 209 must be performed by the client device 100 once the client device 100 has reached the node 203. For instance, if the node 203 were related to cancellation of an order, one constraint 213 could specify that the evaluation of the expression logic 206 or performance of an action 209 must be performed prior to shipment of the order. As another example, if the node 203 were related to purchasing an item that was on sale, one constraint 213 could specify that the evaluation of the expression logic 206 or performance of an action 209 must be performed prior to a specified time that coincides with the end of the sale or promotion. Similarly, a constraint 213 could specify when a result of an action 209 must be reported by or received from the client device 100. For instance, an electronic commerce system may need to maintain accurate inventory records. Accordingly, a constraint 213 may specify that even if the client device 100 processes a purchase action 209, the purchase must be reported to the electronic commerce system within a period of time defined by the constraint 213 or the electronic commerce system will ignore, disregard, or otherwise invalidate the purchase. Other constraints 213 may also be specified as required for various embodiments or implementations.

Figure 3:
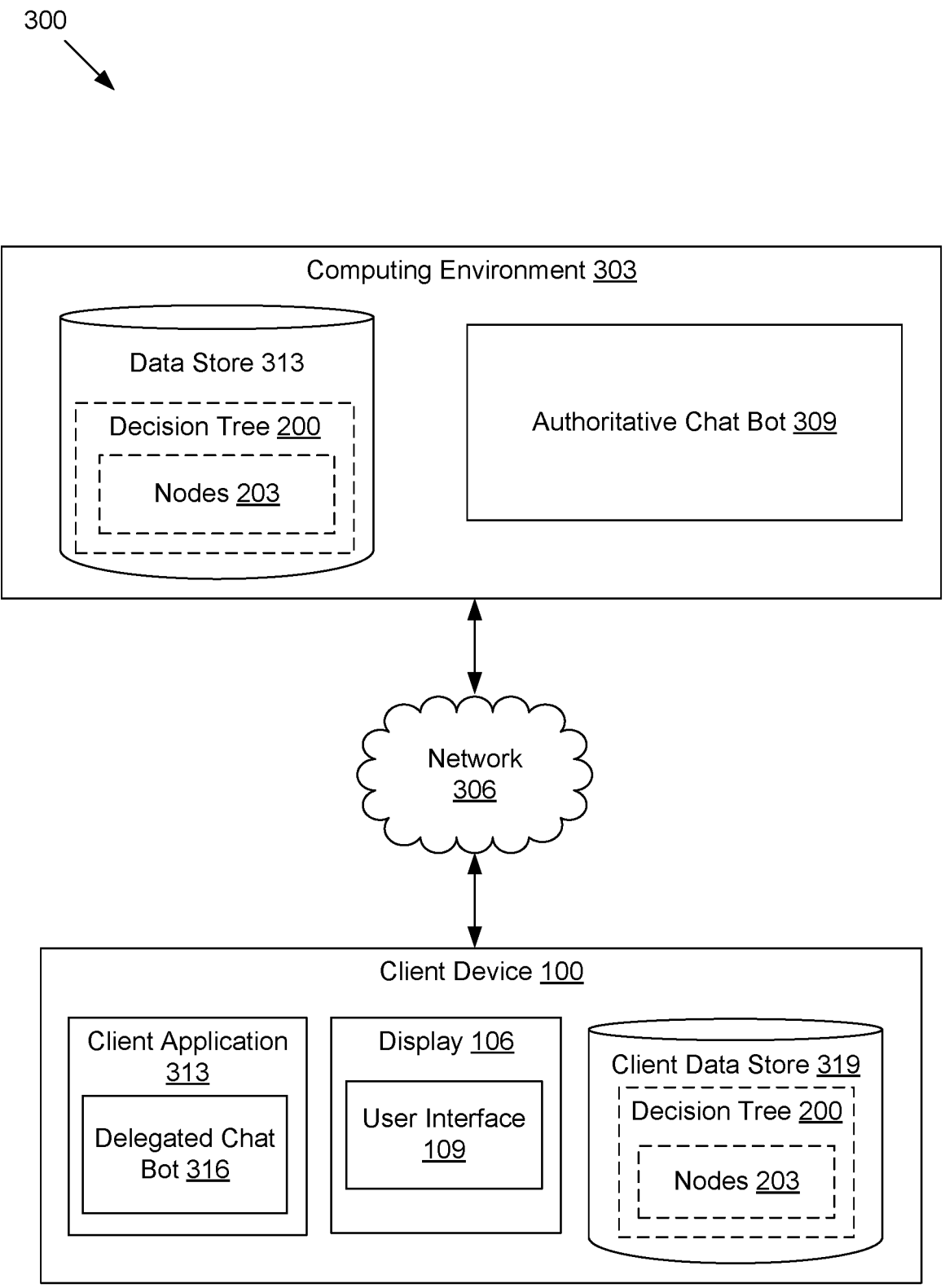
FIG. 3 is a drawing of a networked environment according to various embodiments of the present disclosure.

With reference to FIG. 3, shown is a networked environment 300 according to various embodiments. The networked environment 300 includes a computing environment 203 and a client device 100, which are in data communication with each other via a network 306. The network 306 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 306 can also include a combination of two or more networks 306. Examples of networks 306 can include the Internet, intranets, extranets, virtual private networks (VPNs), and similar networks.

The computing environment 303 may include, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may include a hosted computing resource, a grid computing resource or any other distributed computing arrangement. In some cases, the computing environment 303 may correspond to an elastic computing resource where the allotted capacity of processing, network, storage, or other computing-related resources may vary over time.

Various applications or other functionality may be executed in the computing environment 303 according to various embodiments. The components executed on the computing environment 303, for example, include an authoritative chat bot 309, and other applications, services, processes, systems, engines, or functionality not discussed in detail herein.

The authoritative chat bot 309 is executed to perform a number of functions. The authoritative chat bot 309 can be executed to evaluate user inputs to the client device 100 via the user interface 109 according to expression logic 206 (FIG. 2B) contained within a current node 203 within a decision tree 200. The authoritative chat bot 309 can also be executed to delegate evaluation of the expression logic 206 to determine a user intent to the client device 100. For example, the authoritative chat bot 309 could send one or more nodes 203 from various branches of the decision tree 200 to the client device 100 for local evaluation. As the client device 100 proceed through the decision tree 200, additional nodes 203 descending from the branch of the decision tree 200 taken by the client device 100 could be sent to the client device 100. To maintain state, the authoritative chat bot 309 could also track which node 203 the client device 100 is currently processing.

Also, various data is stored in a data store 313 that is accessible to the computing environment 303. The data store 313 may be representative of a plurality of data stores 313, which can include relational databases, object-oriented databases, hierarchical databases, hash tables or similar key-value data stores, as well as other data storage applications or data structures. The data stored in the data store 313 is associated with the operation of the various applications or functional entities described below. This data can include the decision tree 200, and potentially other data.

The client device 100 is representative of a plurality of client devices that may be coupled to the network 306. The client device 100 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), voice controlled headless devices such as smart speakers (e.g., AMAZON ECHO®, APPLE HOMEPOD®, GOOGLE HOME®, etc.) a videogame console, or other devices with like capability. The client device 100 may include one or more displays 106, such as liquid crystal displays (LCDs), gas plasma-based flat panel displays, organic light emitting diode (OLED) displays, electrophoretic ink ("E-ink") displays, projectors, or other types of display devices. In some instances, the display 106 may be a component of the client device 100 or may be connected to the client device 100 through a wired or wireless connection.

The client device 100 may be configured to execute various applications such as a client application 313 or other applications. The client application 313 may be executed in a client device 100, for example, to access network content served up by the computing environment 303 or other servers, thereby rendering a user interface 109 on the display 106. To this end, the client application 313 may include, for example, a browser, a dedicated application, or other executable and the user interface 109 may include a network page, an application screen, or another user mechanism for obtaining user input. The client device 100 may be configured to execute applications beyond the client application 313 such as, for example, email applications, social networking applications, word processors, spreadsheets, or other applications.

As illustrated, the client application 313 can also execute additional applications. For example, a browser that provides an interpreter for JavaScript, Python, PERL, or other scripting language could execute an application programmed in a scripting language. As another example, some browsers offer the ability to execute native machine code within a sandbox provided by the browser. Such a browser could similarly download and execute an application in binary form. Likewise, the client application 313 could provide an application programming interface (API) that allows for additional or optional components to be added to the client application 313 at a later date, such as plug-ins, modules, or similar components.

One example of an additional application that can be executed by the client application 313 is the delegated chat bot 316. The delegated chat bot 316 can be executed to evaluate user inputs to the client device 100 via the user interface 109 according to expression logic 206 (FIG. 2B) contained within a current node 203 within a decision tree 200. The delegated chat bot 316 could be executed as a component of a network page, such as a chat interface provided within the network page. The delegated chat bot 316 could also be executed as a component of a dedicated application, such as a chat interface included in a stand-alone application executing on a mobile device. However, in some implementations, the delegated chat bot 316 can be executed or implemented as a standalone application rather than as a component of another application (e.g., as a plug-in for another application or an application executed by a browser).

In addition, a client data store 319 may be implemented on the client device 100. The client data store 319 may be representative of a plurality of client data stores 319, which can include relational databases, object-oriented databases, hierarchical databases, hash tables or similar key-value data stores, as well as other data storage applications or data structures. The data stored in the client data store 319 is associated with the operation of the various applications or functional entities described below. This data can include cached nodes 203 of at least a portion of the decision tree 200, and potentially other data.

Next, a general description of the operation of the various components of the networked environment 300 is provided. This general description is intended to illustrate the principles of the various embodiments of the present disclosure. A more detailed description of the operation of specific components is provided in FIGS. 4 and 5 of the present disclosure.

To begin, a user initiates execution of the client application 313, which may causes a user interface 109 to be rendered on the display 106. A portion of the user interface 109 may allow for the user in submit user input to the client application 313, such as key strokes, mouse clicks, mouse movements, touchscreen gestures, taps or touches on a touch screen, and similar user inputs. These user inputs may allow for a user to submit data to the client application 313, such as entering characters or manipulating user interface elements or controls rendered as part of the user interface 109. For example, a user may use a keyboard or touch characters on a touch screen display 106 to submit a sequence of characters to the client application 313. As another example, the user may press a button of the client device 100 or manipulate an element or control rendered in the user interface 109 to turn a camera of the client device 100 on or off, or to switch a microphone of the client device 100 on or off, in order to capture images, video, or audio that can then be submitted to the client application 313 as use input.

In some implementations, the user interface 109 or a portion of the user interface 109 may be used to allow the user to submit input to the delegated chat bot 316. For example, the user interface 109 could allow a user to submit a string or sequence of characters to the delegated chat bot 316, submit an image to the delegated chat bot 316, submit an audio or video stream or file to the delegated chat bot 316, or submit other data to the delegated chat bot 316. For instance, if the delegated chat bot 316 were conducting an automated conversation with a user, the user interface 109 might allow for the user to type and submit a natural language response to a question or statement made by the delegated chat bot 316 and rendered in the user interface 109.

In implementations where the client device 100 lacks a display 106 for the user interface 109, the user may instead submit input through a microphone. For example, a smart speaker with a microphone that provides a voice controller user interface may allow for the user to speak into the microphone. In these implementations, the client device 100 may record a user and use the recording as a user input.

The delegated chat bot 316 may send the initial user input to the authoritative chat bot 309 for initial processing. For example, the authoritative chat bot 309 may use natural language processing to determine what a user's initial intent is when first beginning an interaction with the delegated chat bot 316. For example one user may begin an interaction with the delegated chat bot 316 by asking about the status or an order or to cancel an order. Another user may begin an interaction with the delegated chat bot 316 by asking to reorder a previously purchased item. Other users could begin an interaction with the delegated chat bot 316 by asking to purchase an item that is on sale or asking questions about an existing promotion. Once the authoritative chat bot 309 has determined the user's initial intent (e.g., status inquiry, cancel an order, purchase or reorder a product, or other intent), the authoritative chat bot 309 can select an appropriate decision tree 200 for interacting with the user.

The authoritative chat bot 309 can then send one or more nodes 203 of the selected decision tree 200 to the delegated chat bot 316 executing on the client device 100. In some implementations, the authoritative chat bot 309 may send nodes 203 from multiple branches of the selected decision tree 200. The nodes 203 may even be selected from several levels below the initial node 203 of the decision tree 200. When possible, the authoritative chat bot 309 may send as many nodes 203 from the decision tree as can be stored in the memory of the client device 100. These nodes 203 may be cached by the delegated chat bot 316 in the client data store 319.

The delegated chat bot 316 can use the nodes 203 received from the authoritative chat bot 309 to generate an initial response to the user input as well as subsequent responses to subsequent user inputs. By using the locally cached nodes 203, the delegated chat bot 316 can respond to user input without having to wait for a response from the authoritative chat bot 309, which could be impacted by network latency, network bandwidth, network connectivity, or other network issues. Once a user input is evaluated using the expression logic 206 in the current node 203, the delegated chat bot 316 can move to the next cached node 203 of the decision tree 200.

As the delegated chat bot 316 moves from one locally cached node 203 to the next locally cached node 203 in the decision tree, the delegated chat bot 316 informs the authoritative chat bot 309 which node 203 is the node 203 that is currently being processed by the delegated chat bot 316. For example, the delegated chat bot 316 could send a unique identifier of the node 203 to the authoritative chat bot 309. As another example, the delegated chat bot 316 could send a graphical representation of the path taken through the decision tree 200.

As the current state, as indicated by the current node 203 being processed by the delegated chat bot 316, is updated, the authoritative chat bot 309 may send additional nodes 203 to the delegated chat bot 316 executing on the client device 100 for storage in the client data store 319. These additional nodes 203 can include nodes 203 descending from those branches of the decision tree 200 that include the current node 203 being processed by the delegated chat bot 316. Moreover, the delegated chat bot 316 may delete or otherwise remove from the client data store 319 nodes 203 from branches of the decision tree 200 that have not been pursued and replace the deleted nodes 203 with the additional nodes 203 received from the authoritative chat bot 309.

Figure 4:
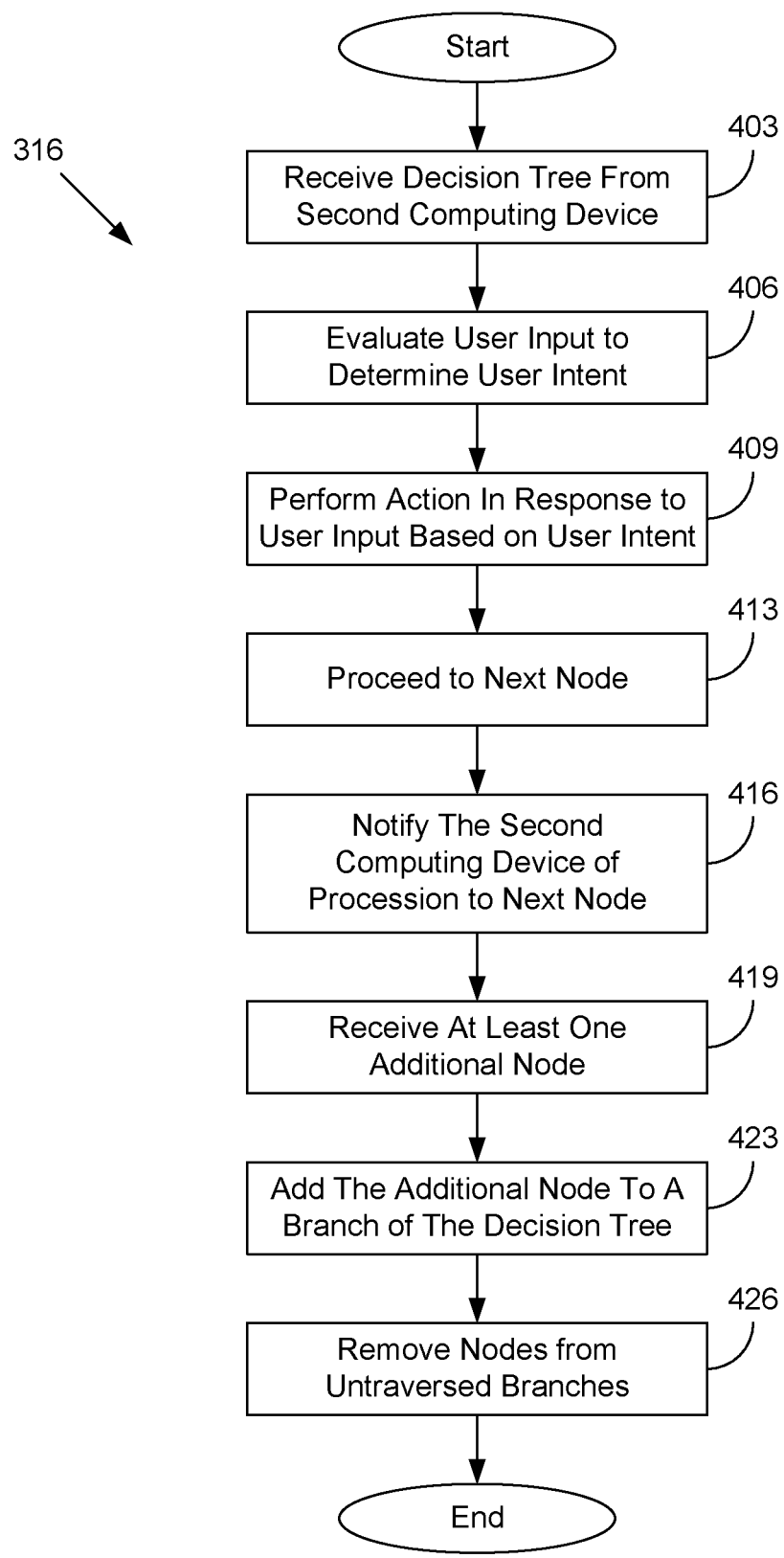
FIG. 4 is a flowchart illustrating one example of functionality implemented as portions of an application executed in the networked environment of FIG. 3 according to various embodiments of the present disclosure.

Referring next to FIG. 4, shown is a flowchart that provides one example of the operation of a portion of the delegated chat bot 316 according to various embodiments. It is understood that the flowchart of FIG. 4 provides merely an example of the many different types of functional arrangements that may be employed to implement the operation of the portion of the delegated chat bot 316 as described herein. As an alternative, the flowchart of FIG. 4 may be viewed as depicting an example of elements of a method implemented in the client device 100 (FIG. 3) according to one or more embodiments.

Beginning with box 403, the delegated chat bot 316 executing on the client device 100 (FIG. 3) receives at least a portion of a decision tree 200 (FIG. 3) from a second computing device in data communication with the client device 100, such as a server executing in the computing environment 303. The received portion of the decision tree 200 can include one or nodes 203 of the decision tree 200, which can include one or more branches. The number of nodes 203 can extend for several levels of the decision tree 200. In some embodiments, such as those where the client device 100 has sufficient memory for the client data store 319, every node 203 in the decision tree 200 may be received by the delegated chat bot 316.

Moving on to box 406, the delegated chat bot 316 evaluates a user input submitted through the user interface 109 with expression logic 206 (FIG. 2B) provided by the current node 203 being evaluated to determine a user's intent. At the beginning of a user interaction, the delegated chat bot 316 may begin processing the decision tree at a first node 203 that acts as a root or head node 203 from which all other nodes 203 in the decision tree 200 descend. Otherwise, the delegated chat bot 316 can evaluate the user input using the expression logic 206 of the current node 203 being evaluated in the decision tree.

For example, in a text-based user interaction, the delegated chat bot 316 could determine whether a portion of a character string matches a regular expression specified by the expression logic 206 of the current node 203. If at least a portion of the character string matches the regular expression, the delegated chat bot 316 could infer the user's intent based at least in part on the match. For example, if the word "Yes" matched a regular expression specified by the expression logic 206, the delegated chat bot 316 could infer that a use is consenting to some action occurring or affirming or confirming previous statement.

In addition, the delegated chat bot 316 could execute expression logic 206 to process audio recorded by a microphone of the client device 100. For instance, the expression logic 206 could cause the delegated chat bot 316 to identify aspects of a user's voice such as pitch, tone, speed, and other factors to determine a user's intent. The expression logic 206 could further cause the delegated chat bot 316 to convert speech in the audio to text and apply one or more regular expressions to the converted text to determine user intent.

As another example, the delegated chat bot 316 could execute the expression logic 206 to perform one or more computer vision techniques to analyze an image or a video and identify a gesture indicating user intent. For instance, if the user nodded his or her head in a particular manner (e.g., up-and-down for yes versus side-to-side for "no") in a video, the delegated chat bot 316 could execute the expression logic 206 to identify the head or face of the user in the video and determine the particular direction the user was shaking or nodding his or her head. The delegated chat bot 316 could execute the expression logic 206 to similarly analyze an image for a gesture (e.g., a thumbs-up gesture or a circle formed by the index finger and the thumb to indicate "OK").

In some implementations, multiple alternative instances of expression logic 206 may be used to evaluate a user input to determine user intent. For example, if the user input fails to match a first regular expression specified by the expression logic 206, the delegated chat bot 316 may use a second regular expression specified by the expression logic 206 to evaluate the user input.

Moreover, the delegated chat bot 316 may consider various constraints 213 (FIG. 2B) specified by the node 203 as part of the evaluation process. For example, if a constraint 213 specifies an expiration time, the delegated chat bot 316 may determine whether processing of the user input is occurring prior to the expiration time. If the constraint 213 is not violated, then the delegated chat bot 316 will continue processing the user input using the locally cached node 203 in the client data store 319. However, if the constraint 213 is violated, the delegated chat bot 316 may halt operation and ask for new nodes 203 from a new decision tree 200 to handle the evaluation of the user input after the passing of the expiration time. Violations of other constraints 213 may be handled similarly by the delegated chat bot 316.

Proceeding to box 409, the delegated chat bot 316 performs an action 209 (FIG. 2B) in response to the user input. The delegated chat bot 316 may select an action 209 to perform from multiple possible actions 209 specified by the current node 209 based at least in part on the user intent determined at box 406. For example, if a user were determined to be consenting or assenting, one action 209 might be performed. Likewise, if the user were determined to be dissenting, a different action 209 might be performed.

In some instances, the action 209 to be performed includes generating a response to be presented to the user. For example, one action 209 could be to provide a question to the user through the user interface 109 to request additional information. For instance, if the user intent is to cancel an order, the action 209 could be to prompt the user through the user interface 109 to provide an order identifier (e.g., an order number). The prompt could include text rendered on the display 106 of the client device 100, or audio rendered using a computer-generated voice through a speaker of the client device 100.

In other instances, the action 209 could involve some action to be performed by the client device 100 or other computing device in the computing environment 303 (FIG. 3). As an example, if the user intent was to provide an order number, and the delegated chat bot 316 had determine that the user had submitted an order number, the action 209 could include sending a request to cancel the order and the order number to delivery service, electronic commerce platform, or other entity. In this example, the delegated chat bot 216 could send a request to an application provided by the delivery service or electric commerce platform to cancel the order or invoke a function call provided by an application programming interface (API) of a network service executed by the delivery service or electronic commerce platform. If the user intent was to perform a search (e.g., a web search, a product search, or similar search), then the action 209 could include executing the requested search and rendering the results within the user interface 109.

Referring next to box 413, the delegated chat bot 316 then proceeds to the next node 203 in the portion of the decision tree 200 cached in the client data store 319. For example, after performing an action 209 at box 409, the delegated chat bot 316 may move to the node 203 in the decision tree 200 specified by the action 209.

Moving on to box 416, the delegated chat bot 316 notifies the second computing device that it has proceeded to a new node 203 cached in the client data store 319. For example, the delegated chat bot 316 could provide a unique identifier of the new node 203 to the second computing device.

Proceeding next to box 419, the delegated chat bot 316 receives one or more additional nodes 203 from the second computing device. The additional nodes 203 may be nodes that descend from the branches of the decision tree 200 that include the new node 203. These additional nodes 203 can be cached in the client data store 319.

Referring next to box 423, the delegated chat bot 316 inserts the additional nodes 203 received from the second computing device into the decision tree 200 cached in the client data store 319. For example, if a received node 203 is identified as being a child node 203 of one of the currently cached nodes 203, then the received node 203 can be added to the cached decision tree 200 as a child node 203 of the cached node 203.

Moving on to box 426, the delegated chat bot 316 analyzes the decision tree 200 cached in the client data store 319 to identify those nodes 203 that are in branches of the decision tree 200 that are untraversed. For example, if the previously processed node 203 in the decision tree 200 includes two child nodes 203, and the delegated chat bot 316 elects to proceed to the first of the two child nodes 203 at box 413, the delegated chat bot 316 may remove any nodes 203 descending from the second of the two child nodes 203 because those nodes 203 are now in a branch of the decision tree 200 that will not be traversed. Removing previously cached nodes 203 from an untraversed branch of the decision tree 200 allows for the space in the client data store 319 to be reused for additional nodes 203 which are in branches of the decision tree 200 that descend from the current node 203. A breadth-first-search or a depth-first-search starting at the unelected child node 203 can be used to identify all nodes 203 to be deleted from the client data store 319.

Figure 5:
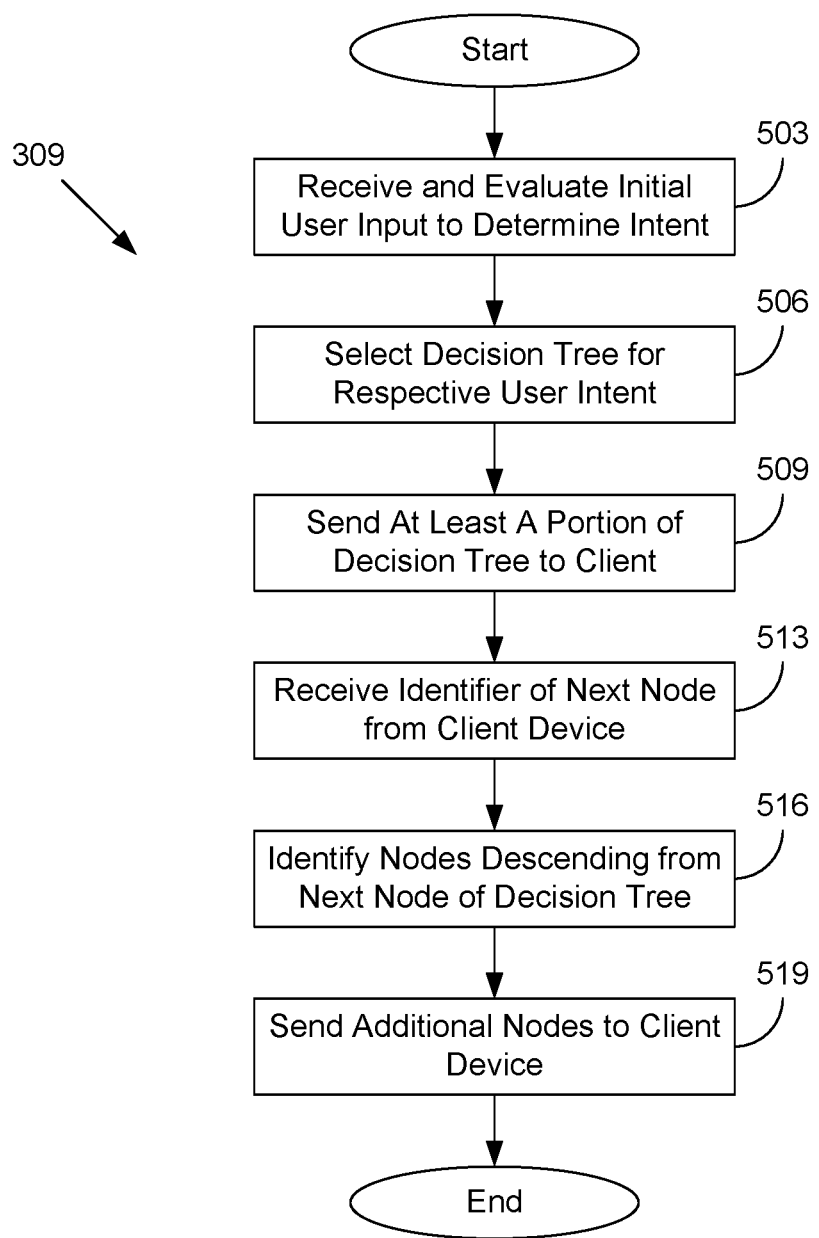
FIG. 5 is a flowchart illustrating one example of functionality implemented as portions of an application executed in the networked environment of FIG. 3 according to various embodiments of the present disclosure.

Referring next to FIG. 5, shown is a flowchart that provides one example of the operation of a portion of the authoritative chat bot 309 according to various embodiments. It is understood that the flowchart of FIG. 5 provides merely an example of the many different types of functional arrangements that may be employed to implement the operation of the portion of the authoritative chat bot 309 as described herein. As an alternative, the flowchart of FIG. 5 may be viewed as depicting an example of elements of a method implemented in the computing environment 303 (FIG. 3) according to one or more embodiments.

Beginning with box 503, the authoritative chat bot 309 receives and evaluates a user input from the delegated chat bot 316 to determine an initial user intent. For example, a user may have submitted free-form text through a component of the user interface 109 (FIG. 3), or submitted an audio or video file containing a verbal request or instruction. The authoritative chat bot 309 can use one or more natural language processing (NLP) techniques to determine the user's intent.

Next at box 506, the authoritative chat bot 309 selects a decision tree 200 that corresponds to processing a user interaction for the respectively identified user intent. For example, if a user wishes to purchase an item, the authoritative chat bot 309 may select a first decision tree 200 that models an item purchase process. As another example, if a user wishes to cancel an order, the authoritative chat bot 309 may select a second decision tree 200 that models an order cancellation process. Similarly, if a user's intent is to return or exchange an item, the authoritative chat bot 309 may select a decision tree 200 that models the item return or exchange process.

As part of the process of selecting a decision tree 200, the authoritative chat bot 309 may initiate a timer in order to enforce one or more constraints 213 (FIG. 2B) specified by one or more nodes 203 (FIG. 2A) of the selected decision tree 200. For example, if a node 203 includes a constraint 213 that states that the delegated chat bot 316 must report a result of an evaluation of the decision tree 200 within forty-eight (48) hours, the authoritative chat bot 309 may initiate a timer that will expire in forty-eight (48) hours. As an example, an electronic commerce vendor may promise to ship orders within a promised period of time (e.g., within 24 or 48 hours of an order being placed). Accordingly, the electronic commerce vendor may specify a constraint 213 within nodes 203 of a decision tree 200 related to cancelling an order that the client device 100 must provide the authoritative chat bot 309 with an order identifier and a confirmation to cancel the order prior to the expiration of the promised shipment time.

Moving on to box 509, the authoritative chat bot 309 sends at least a portion of the selected decision tree 200 to the delegated chat bot 316. For example, the authoritative chat bot 309 may send the root node 203 of the decision tree 200 as well as the child nodes 203 and grandchild nodes 203 of the root node 203. However, if the delegated chat bot 316 indicates that there is sufficient storage space on the client device 100 (FIG. 3), the authoritative chat bot 309 could send additional nodes 203 to the delegated chat bot 316. Likewise, the authoritative chat bot 309 could send fewer nodes 203 initially if the delegated chat bot 316 indicated there was not enough storage available on the client device 100 for so many nodes 203 initially.

Later, at box 513, the authoritative chat bot 309 receives an identifier of the next node 203 in the decision tree 200 that the delegated chat bot 316 has proceed to. For example, if a node 203 had several child nodes 203 representing several different potential decisions and actions that could be made or taken in response to a user input, the authoritative chat bot 309 can receive an identifier of the child node 203 representing the result of the evaluation of a user input by the delegated chat bot 316.

However, in those examples where a constraint 213 has been specified that a response needs to be received from the delegated chat bot 316 prior to the expiration of a predefined period of time, the authoritative chat bot 309 may first check to determine whether the predefined period of time has expired. For example, the authoritative chat bot 309 may check to see if the timer previously set at box 506 has expired. If the predefined period of time for the delegated chat bot 316 to provide a response or perform an action 209 has not expired, then the authoritative chat bot 309 may continue to box 516. Otherwise, the authoritative chat bot 309 would send a message to the delegated chat bot 316 indicating that the decision tree 200 is no longer valid for processing, which may cause the delegated chat bot 316 to delete the previously cached nodes 203. The process would then end for the authoritative chat bot 309.

In response, at box 516, the authoritative chat bot 309 can evaluate the decision tree 200 to determine which nodes 203 remain in branches descending from the next node 203 to be processed, as identified at box 513. For example, the authoritative chat bog 309 can perform a breadth-first-search or a depth-first-search from the next node 203 to identify all descending nodes 203.

Then, at box 519, the authoritative chat bot 309 can send to the delegated chat bot 316 one or more nodes 203 identified at box 516 as descending from the next node 203 that have not been previously sent to the delegated chat bot 316. For example, if two child nodes 203 of the next node 203 had been previously sent to the delegated chat bot 316, but none of the grandchild or great grandchild nodes 203 had been sent to the delegated chat bot 316, the authoritative chat bot 309 could send one or more of the grandchild and great grandchild nodes 203 to the delegated chat bot 316. The number of nodes to be sent to the delegated chat bot 316 may be based at least in part on the amount of available memory in the client data store 319, which may have been previously indicated to authoritative chat bot 309 by the delegated chat bot 316.

The operations performed at boxes 513, 516, and 519 may be repeated as the delegated chat bot 316 continues to interact with the user and process the decision tree 200. For example, as the delegated chat bot 316 moves from one node 203 to another node 203, it may continue to update the authoritative chat bot 309. In response, the authoritative chat bot 309 may continue to send additional nodes 203 to the delegated chat bot 316 to cache for potential future use.

Figure 6:
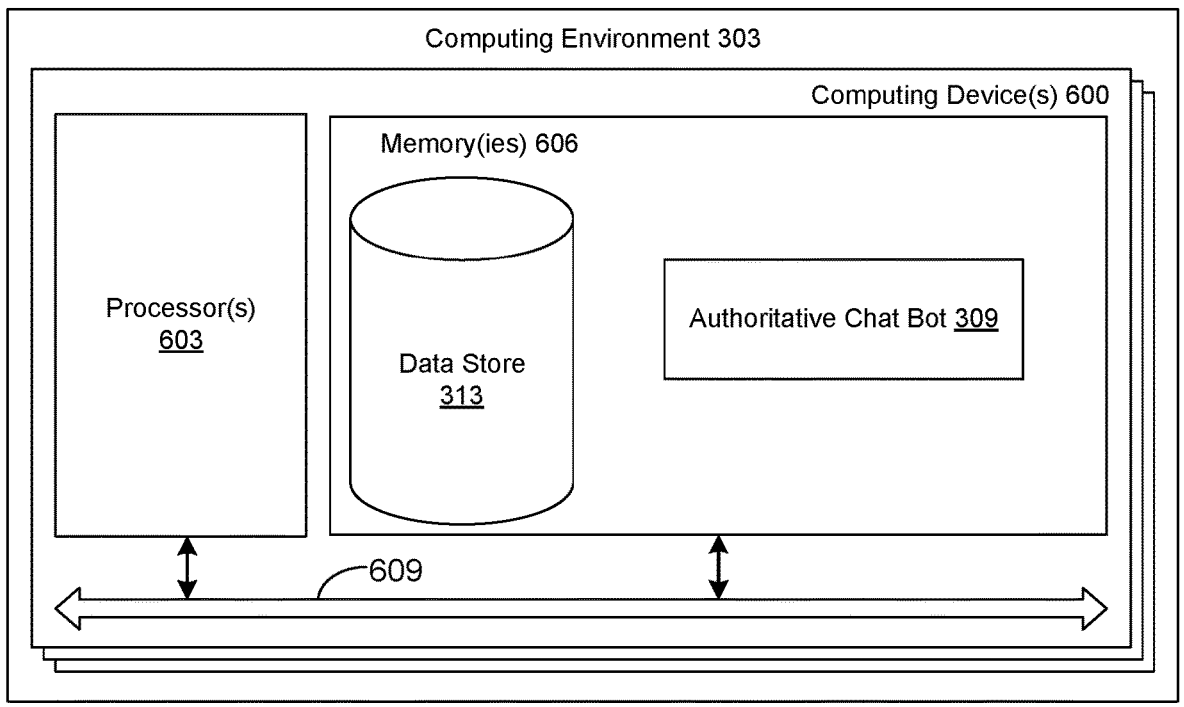
FIG. 6 is a schematic block diagram that provides one example illustration of a computing environment employed in the networked environment of FIG. 3 according to various embodiments of the present disclosure.

With reference to FIG. 6, shown is a schematic block diagram of the computing environment 303 according to an embodiment of the present disclosure. The computing environment 303 includes one or more computing devices 600. Each computing device 600 includes at least one processor circuit, for example, having a processor 603 and a memory 606, both of which are coupled to a local interface 609. To this end, each computing device 600 may include, for example, at least one server computer or like device. The local interface 609 may include, for example, a data bus with an accompanying address/control bus or other bus structure as can be appreciated.

Stored in the memory 606 are both data and several components that are executable by the processor 603. In particular, stored in the memory 606 and executable by the processor 603 is the authoritative chat bot 309, and potentially other applications. Also stored in the memory 606 may be a data store 313 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606. The local interface 609 may include additional systems designed to coordinate this communication, including, for example, performing load balancing. The processor 603 may be of electrical or of some other available construction.

Figure 7:
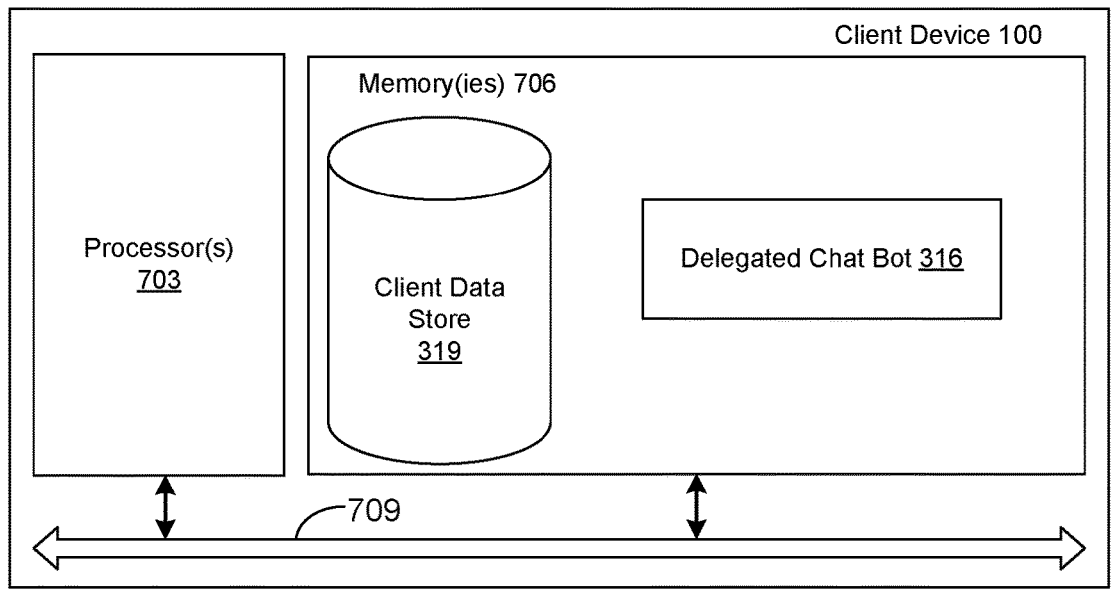
FIG. 7 is a schematic block diagram that provides an example of a client device of FIG. 1 and FIG. 3 according to various embodiments of the present disclosure.

With reference to FIG. 7, shown is a schematic block diagram of the client device 100, which can include a processor 703 and a memory 706, both of which are coupled to a local interface 709. The local interface 709 may include, for example, a data bus with an accompanying address/control bus or other bus structure as can be appreciated.

Stored in the memory 706 are both data and several components that are executable by the processor 703. In particular, stored in the memory 706 and executable by the processor 703 is the delegated chat bot 316, and potentially other applications. Also stored in the memory 706 may be a client data store 319 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 703 may represent multiple processors 703 or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706. The local interface 709 may include additional systems designed to coordinate this communication, including, for example, performing load balancing. The processor 703 may be of electrical or of some other available construction.

Although the authoritative chat bot 309 and the delegated chat bot 316, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the authoritative chat bot 309 and the delegated chat bot 316. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 603 or processor 703 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authoritative chat bot 309 and the delegated chat bot 316, that includes software or code can be embodied in any non-transitory computer-readable medium for use by or in connection with an instruction execution system such as, for example, a processor 603 or a processor 703 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authoritative chat bot 309 and the delegated chat bot 316, may be implemented and structured in a variety of ways. For example, one or more applications described may be implemented as modules or components of a single application. Further, one or more applications described herein may be executed in shared or separate computing devices or a combination thereof.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a first computing device comprising a processor and a memory; and
machine readable instructions stored in the memory that, when executed by the processor, cause the first computing device to at least:
receive a portion of a decision tree from a second computing device in data communication with the first computing device, the portion of the decision tree comprising a plurality of nodes, each node comprising a regular expression for evaluating a user input comprising a character string inputted through a user interface provided by the first computing device to determine a user intent and identifying a next node to proceed to in the portion of the decision tree based at least in part on the user intent;
determine that the character string has been inputted through the user interface within a predefined period of time specified by a current node in the portion of the decision tree;
evaluate the character string with the regular expression specified by the current node in the portion of the decision tree to determine the user intent in response to a determination that the character string had been inputted within the predefined period of time;
proceed to the next node in the portion of the decision tree specified by the current node in the decision tree based at least in part on the user intent;
notify the second computing device that the first computing device has proceeded to the next node in the portion of the decision tree;
receive at least one additional node to add to the portion of the decision tree from the second computing device;
add the at least one additional node to a first branch of the portion of the decision tree descending from the next node in the portion of the decision tree;
remove from the portion of the decision tree a set of nodes included in a second branch of the portion of the decision tree that omits the next node;
generate a response to the user input based at least in part on the user intent; and
provide the response within the user interface.

2. The system of claim 1, wherein the user interface comprises a network page rendered by a browser executed by the first computing device.

3. The system of claim 1, wherein the user interface comprises a component of a chat application executed by the first computing device.

4. A system, comprising:
a first computing device comprising a processor and a memory; and
machine readable instructions stored in the memory that, when executed by the processor, cause the first computing device to at least:
receive a portion of a decision tree from a second computing device in data communication with the first computing device, the portion of the decision tree comprising a plurality of nodes, each node comprising expression logic for evaluating a user input to determine a user intent and identifying a next node to proceed to in the decision tree based at least in part on the user intent;
evaluate the user input according to the expression logic of a current node in the decision tree to determine the user intent;
proceed to the next node in the decision tree specified by the current node in the portion of the decision tree based at least in part on the user intent;
notify the second computing device that the first computing device has proceeded to the next node in the portion of the decision tree;
receive at least one additional node to add to the portion of the decision tree from the second computing device; and
add the at least one additional node to at least one branch of the portion of the decision tree descending from the next node in the portion of the decision tree.

5. The system of claim 4, wherein the at least one branch of the portion of the decision tree descending from the next node in the portion of the decision tree is a first branch and the machine readable instructions, when executed by the processor, further cause the first computing device to at least remove from the portion of the decision tree a set of nodes included in a second branch of the portion of the decision tree that omits the next node.

6. The system of claim 4, wherein the machine readable instructions, when executed by the processor, further cause the first computing device to at least:
generate a response to the user input based at least in part on the user intent; and
provide the response within a user interface.

7. The system of claim 6, wherein the next node in the portion of the decision tree specifies the response to the user input to be generated by the first computing device.

8. The system of claim 6, wherein the user interface comprises at least one of a component of a network page or a component of a chat application.

9. The system of claim 4, wherein the machine readable instructions further cause the first computing device to determine that the user input has been received within a predefined period of time, and the machine readable instructions that cause the first computing device to evaluate the user input cause the first computing device to evaluate the user input in response to a determination that the user input has been received within the predefined period of time.

10. The system of claim 4, wherein the user input comprises a media file captured by the first computing device, and the expression logic comprises additional machine readable instructions that cause the first computing device to identify a gesture in the media file.

11. The system of claim 4, wherein the user input comprises an audio stream expression comprising speech, and the expression logic comprises additional machine readable instructions that cause the first computing device to convert the speech of the audio stream to a character string and apply a regular expression to the character string.

12. The system of claim 4, wherein the user input is a character string and the expression logic is a regular expression to evaluate the character string.

13. A method, comprising
receiving, via a first computing device, a portion of a decision tree from a second computing device in data communication with the first computing device, the portion of the decision tree comprising a plurality of nodes, each node comprising expression logic for evaluating a user input to determine a user intent and identifying a next node to proceed to in the decision tree based at least in part on the user intent;
evaluating, via the first computing device, the user input according to the expression logic of a current node in the decision tree to determine the user intent;
proceeding, via the first computing device, to the next node in the decision tree specified by the current node in the portion of the decision tree based at least in part on the user intent;
notifying, via the first computing device, the second computing device that the first computing device has proceeded to the next node in the portion of the decision tree;
receiving, via the first computing device, at least one additional node to add to the portion of the decision tree from the second computing device; and
adding, via the first computing device, the at least one additional node to at least one branch of the portion of the decision tree descending from the next node in the portion of the decision tree.

14. The method of claim 13, wherein the at least one branch of the portion of the decision tree descending from the next node in the portion of the decision tree is a first branch and the further comprises removing, via the first computing device, from the portion of the decision tree a set of nodes included in a second branch of the portion of the decision tree that omits the next node.

15. The method of claim 13, further comprising
generating, via the first computing device, a response to the user input based at least in part on the user intent; and
providing, via the first computing device, the response within a user interface.

16. The method of claim 15, wherein the next node in the portion of the decision tree specifies the response to the user input to be generated by the first computing device.

17. The method of claim 15, wherein the user interface comprises at least one of a component of a network page or a component of a chat application.

18. The method of claim 13, further comprising
determining, via the first computing device, that the user input has been received within a predefined period of time; and
wherein evaluating, via the first computing device, the user input is performed in response to determining that the user input has been received within the predefined period of time.

19. The method of claim 13, wherein the user input comprises a media file captured by the first computing device, and the expression logic comprises additional machine readable instructions that cause the first computing device to identify a gesture in the media file.

20. The method of claim 13, wherein the user input comprises an audio stream expression comprising speech, and the expression logic comprises additional machine readable instructions that cause the first computing device to convert the speech of the audio stream to a character string and apply a regular expression to the character string.

* * * * *